United States Patent
Sato et al.

(10) Patent No.: US 7,854,247 B2
(45) Date of Patent: Dec. 21, 2010

(54) ULTRASONIC VIBRATION BONDING RESONATOR

(75) Inventors: Shigeru Sato, Fukuoka (JP); Mayumi Kouya, Fukuoka (JP); Mitsugu Katsumi, Fukuoka (JP); Ryoichi Ishii, Fukuoka (JP)

(73) Assignee: Ultex Corporation, Fukuoka (JP)

( * ) Notice: Subject to any disclaimer, the term of this patent is extended or adjusted under 35 U.S.C. 154(b) by 213 days.

(21) Appl. No.: 12/207,729

(22) Filed: Sep. 10, 2008

(65) Prior Publication Data

US 2009/0266869 A1 Oct. 29, 2009

(30) Foreign Application Priority Data

Apr. 28, 2008 (JP) .............................. 2008-117796

(51) Int. Cl.
*B32B 37/00* (2006.01)
(52) U.S. Cl. .............................. 156/580.1; 310/323.18
(58) Field of Classification Search ................ 156/73.1, 156/580.1, 580.2; 228/110.1, 1.1; 264/442, 264/443, 444, 445; 310/321, 323.01, 323.18; 425/174.2
See application file for complete search history.

(56) References Cited

U.S. PATENT DOCUMENTS

| 5,603,444 | A | 2/1997 | Sato |
| 6,109,502 | A | 8/2000 | Sato |
| 6,168,063 | B1 * | 1/2001 | Sato et al. ..................... 228/1.1 |
| 6,247,628 | B1 | 6/2001 | Sato et al. |
| 6,497,354 | B2 * | 12/2002 | Takahashi et al. ............. 228/1.1 |
| 6,743,331 | B2 * | 6/2004 | Takahashi et al. ......... 156/580.2 |
| 6,877,648 | B2 * | 4/2005 | Higashiyama .............. 228/1.1 |
| 2003/0136523 | A1 | 7/2003 | Takahashi et al. |

FOREIGN PATENT DOCUMENTS

| EP | 1074330 A2 | 2/2001 |
| JP | 08-019877 A | 1/1996 |
| JP | 2000-093894 A | 4/2000 |
| JP | 2001-038291 A | 2/2001 |
| JP | 2002-043377 A | 2/2002 |
| JP | 2002-177881 A | 6/2002 |
| JP | 2002-222834 A | 8/2002 |
| JP | 2002-334909 A | 11/2002 |

\* cited by examiner

*Primary Examiner*—James Sells
(74) *Attorney, Agent, or Firm*—Sughrue Mion, PLLC

(57) ABSTRACT

An ultrasonic vibration bonding resonator includes a resonance body, bonding working portions having a bonding working face and provided at a point of maximum oscillation on upper and lower surfaces of the resonance body and support portions provided at two points of minimum oscillation apart from the bonding working portions to opposite sides in a direction of ultrasonic vibration as projecting from front and back surfaces of the resonance body. It includes a resonance body, tool-attaching portions provided at a point of maximum oscillation on upper and lower surfaces of the resonance body, a bonding working portion having a bonding working face and attached to one of the tool-attaching portions, and support portions provided at two points of minimum oscillation apart from the bonding working portion to opposite sides in a direction of ultrasonic vibration as projecting from front and back surfaces of the resonance body.

6 Claims, 7 Drawing Sheets

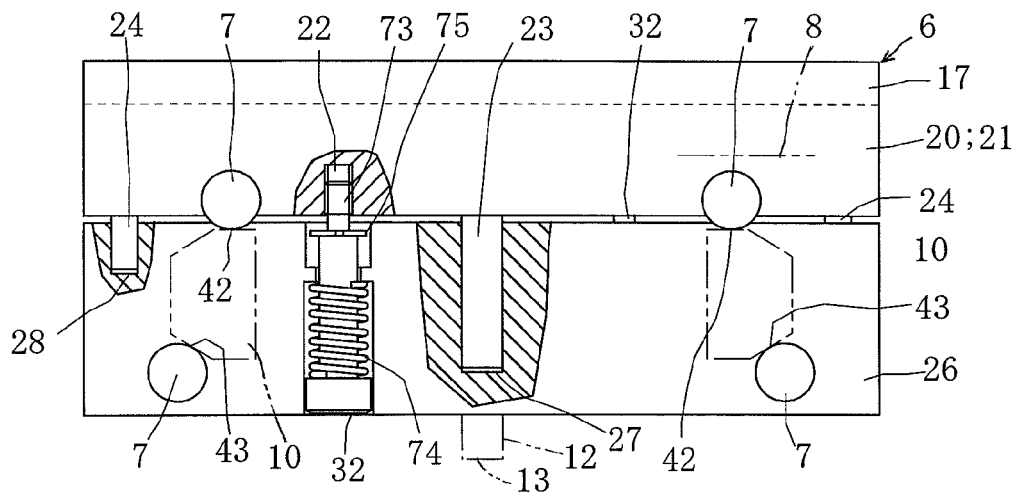

US 7,854,247 B2

ULTRASONIC VIBRATION BONDING RESONATOR

BACKGROUND OF THE INVENTION

1. Field of the Invention

The present invention relates to an ultrasonic vibration bonding resonator having a simple structure to be supported.

2. Description of the Prior Art

The resonator-supporting device disclosed in JP-A 2002-222834 is shown in FIG. 10, in which grasp portions 86 of a supporting device 85 support linearly support portions 88 of a resonator 87. However, since the conventional device has a configuration in which each of plural pairs of grasp portions 86 standing face to face vertically supports one support portion 88 in the vertical direction, it is at a disadvantage in complicating the structure thereof. In addition, since the upper and lower surfaces of the support portion 88 coming into contact with the grasp portion 86 are in parallel to each other, the resonator 87 entails the problem that its lateral position is difficult to determine.

The object of the present invention is to solve the problems lying in the complicated structure for supporting an ultrasonic vibration bonding resonator and in the difficulty in determining the lateral position of the resonator.

SUMMARY OF THE INVENTION

To attain the above object, the present invention provides as the first aspect thereof an ultrasonic vibration bonding resonator comprising a resonance body, bonding working portions having a bonding working face and provided at a point of maximum oscillation on upper and lower surfaces of the resonance body, and support portions provided at two points of minimum oscillation apart from the bonding working portions to opposite sides in a direction of ultrasonic vibration as projecting from front and back surfaces of the resonance body, wherein each of the support portions assumes a hexagonal shape, when being seen from a front side, having upper and lower horizontal faces, upper and lower slant faces and right and left vertical faces, and the horizontal faces are in parallel to the bonding working face, and wherein an extended line of the upper slant face of the support portion at one of the two points of minimum oscillation apart from the bonding working portions to the opposite sides in the direction of ultrasonic vibration and an extended line of the upper slant face of the support portion at the other of the two points of minimum oscillation intersect at a certain point existing on a perpendicular line relative to the bonding working portion and passing through the point of maximum oscillation, an extended line of the lower slant face of the support portion at one of the two points of minimum oscillation apart from the bonding working portions to the opposite sides in the direction of ultrasonic vibration and an extended line of the lower slant face of the support portion at the other of the two points of minimum oscillation intersect at a certain point existing on the perpendicular line relative to the bonding working portion, which line passes through the point of maximum oscillation, and each of the extended lines of the upper slant faces and the perpendicular line form between them an angle equal to an angle formed between each of the extended lines of the lower slant faces and the perpendicular line.

The present invention also provides as the second aspect thereof an ultrasonic vibration bonding resonator comprising a resonance body, tool-attaching portions provided at a point of maximum oscillation on upper and lower surfaces of the resonance body, a bonding working portion having a bonding working face and attached to one of the tool-attaching portions with a screw, support portions provided at two points of minimum oscillation apart from the bonding working portion to opposite sides in a direction of ultrasonic vibration as projecting from front and back surfaces of the resonance body, wherein each of the support portions assumes a hexagonal shape, when being seen from a front side, having upper and lower horizontal faces, upper and lower slant faces and right and left vertical faces, and the horizontal faces are in parallel to the bonding working face, and wherein an extended line of the upper slant face of the support portion at one of the two points of minimum oscillation apart from the bonding working portions to the opposite sides in the direction of ultrasonic vibration and an extended line of the upper slant face of the support portion at the other of the two points of minimum oscillation intersect at a certain point existing on a perpendicular line relative to the bonding working portion and passing through the point of maximum oscillation, an extended line of the lower slant face of the support portion at one of the two points of minimum oscillation apart from the bonding working portions to the opposite sides in the direction of ultrasonic vibration and an extended line of the lower slant face of the support portion at the other of the two points of minimum oscillation intersect at a certain point existing on the perpendicular line relative to the bonding working portion, which line passes through the point of maximum oscillation, and each of the extended lines of the upper slant faces and the perpendicular line form between them an angle equal to an angle formed between each of the extended lines of the lower slant faces and the perpendicular line.

The present invention further provides as the third aspect thereof the ultrasonic vibration bonding resonator according to first or second aspect of the invention further comprising a supporting device for supporting that comprises an upper substrate, two lower substrates separated from each other in forward and backward directions, and a resilient body, wherein the upper substrate is provided with four grasp portions each in point contact with or, in forward and backward directions, in linear contact with each of the upper horizontal faces of the support portions of the ultrasonic vibration bonding resonator, and the lower substrates are provided with four grasp portions each in point contact with or, in the forward and backward directions, in linear contact with each of the lower slant faces of the support portions of the ultrasonic vibration bonding resonator, and wherein the resilient body affords resilience to the upper and lower substrates for biasing the upper and lower substrates to become close to each other.

In the fourth aspect of the present invention that includes the ultrasonic vibration bonding resonator of the third aspect, the upper substrate is provided with guide rods projecting downward and the lower substrates are provided with guide holes, each in a form of a dent or through hole extending from upward to downward, for receiving the guide rods so that the guide rods may ascend and descend. Otherwise, the upper substrate may be provided with guide holes each in a form of a dent or through hole extending from downward to upward and the lower substrates may be provided with guide rods projecting upward for being received in the guide holes so that the guide rods may ascend and descend.

In the ultrasonic vibration bonding resonator and supporting device for supporting the same according the present invention, the position at which the ultrasonic vibration bonding resonator is attached to the supporting device can accurately be set to enable the members to be bonded appropriately. In addition, the four support portions of the ultrasonic vibration bonding resonator can individually supported with the minimum number of eight grasp portions of the supporting device, with one support portion of the ultrasonic vibration bonding resonator pinched between a pair of grasp portions of the supporting device in the upward and downward directions. Thus, the supporting structure is simple. Furthermore, since the pair of grasp portions of the supporting device pinches the support portion of the ultrasonic vibration bonding resonator at the upper horizontal face and lower slant face thereof in the upward and downward directions, the merit thereof prevents the resonator from being displaced laterally. In the supporting device of the present invention, the upper substrate is provided with the guide rods or guide holes and the lower substrates are provided with guide holes or guide rods. When the guide rods of the upper substrate or lower substrates have been fitted in the guide holes of the lower substrates or upper substrate so that the guide rods may be moved vertically, the lateral movement of the lower substrates relative to the upper substrate can be prevented, resulting in a merit of enabling the ultrasonic vibration bonding resonator to be appropriately supported.

The above and other objects, characteristic features and advantages of the present invention will become apparent to those skilled in the art from the description to be given herein below with reference to the accompanying drawings.

BRIEF DESCRIPTION OF THE DRAWINGS

FIG. 8 is a schematic view showing that the resonator has been mounted on the supporting device according to the best embodiment.

FIG. 9 is a front view showing a resonator according to another embodiment of the present invention.

FIG. 10 is a perspective view showing that a conventional resonator has been mounted on a conventional supporting device.

DETAILED DESCRIPTION OF THE PREFERRED EMBODIMENTS

Figure 1:
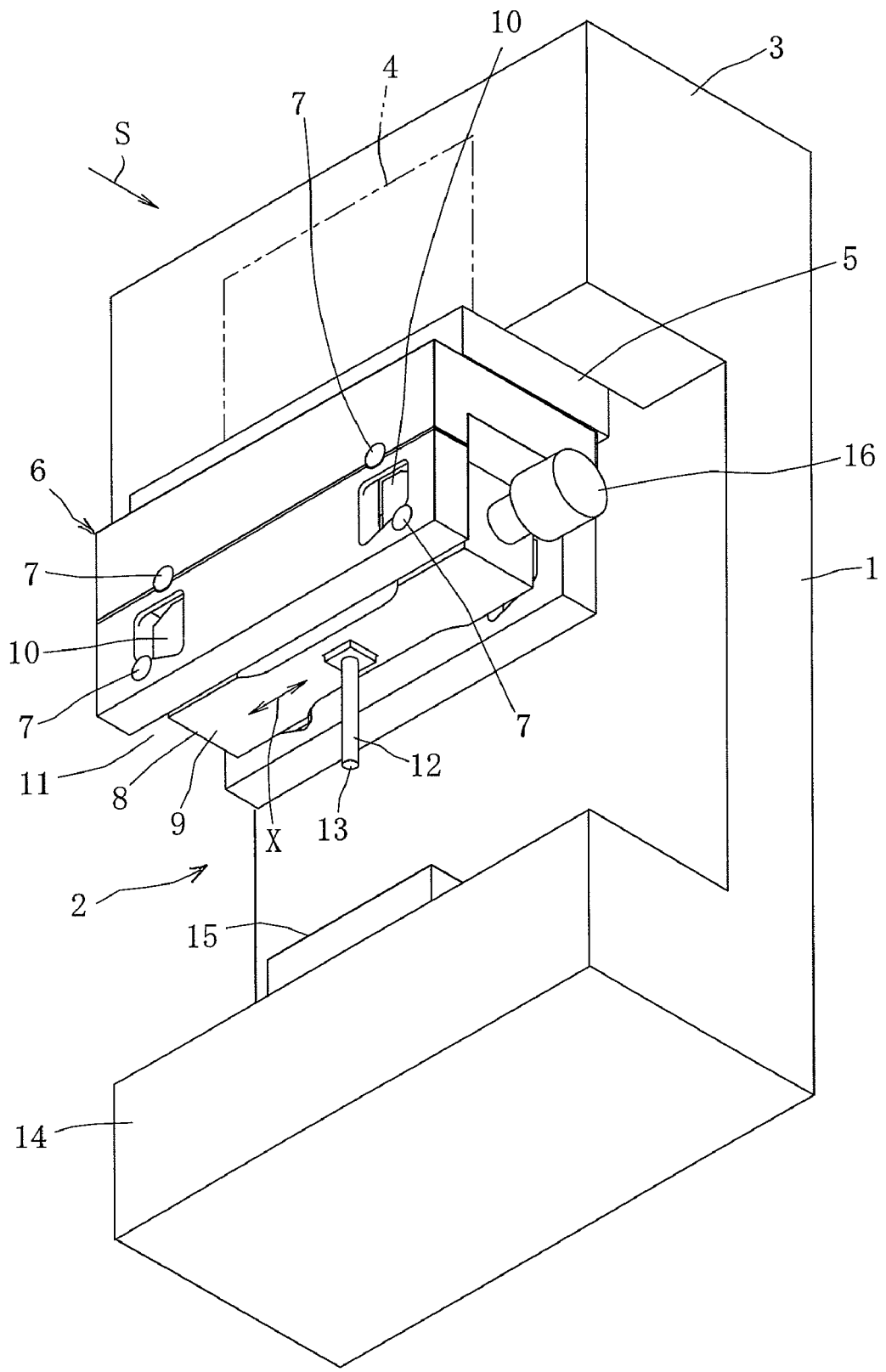
FIG. 1 is a perspective view showing an ultrasonic vibration bonding device according to the best embodiment of the present invention
Figure 2:
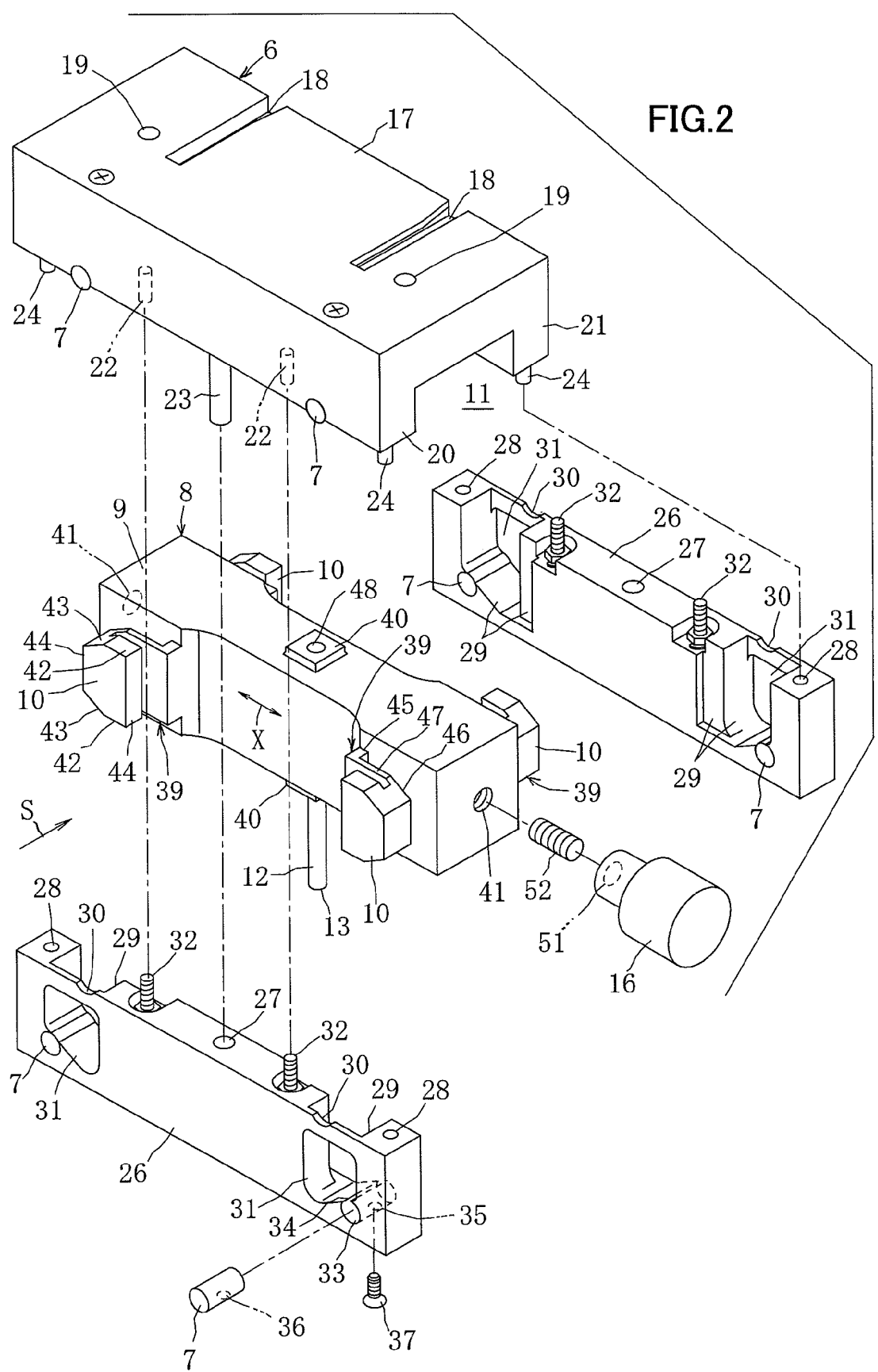
FIG. 2 is an exploded perspective view showing a resonator, an oscillator and a supporting device according to the best embodiment.
Figure 3:
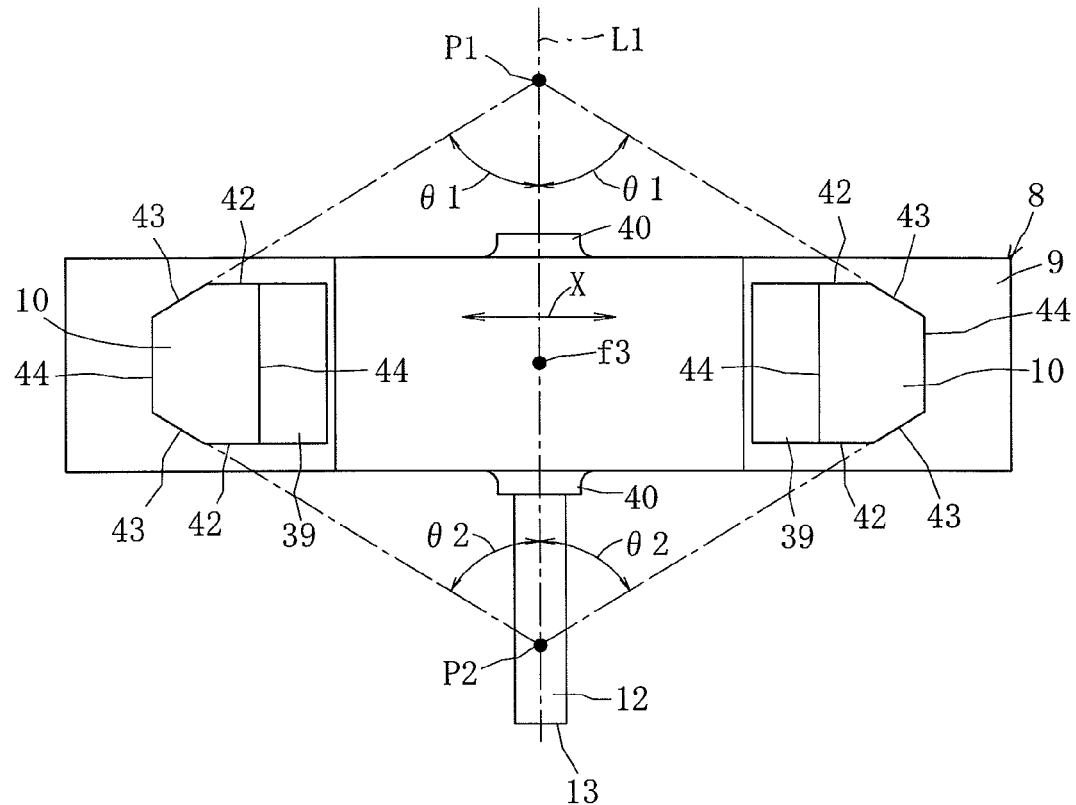
FIG. 3 is a front view showing the oscillator according to the best embodiment.
Figure 4:
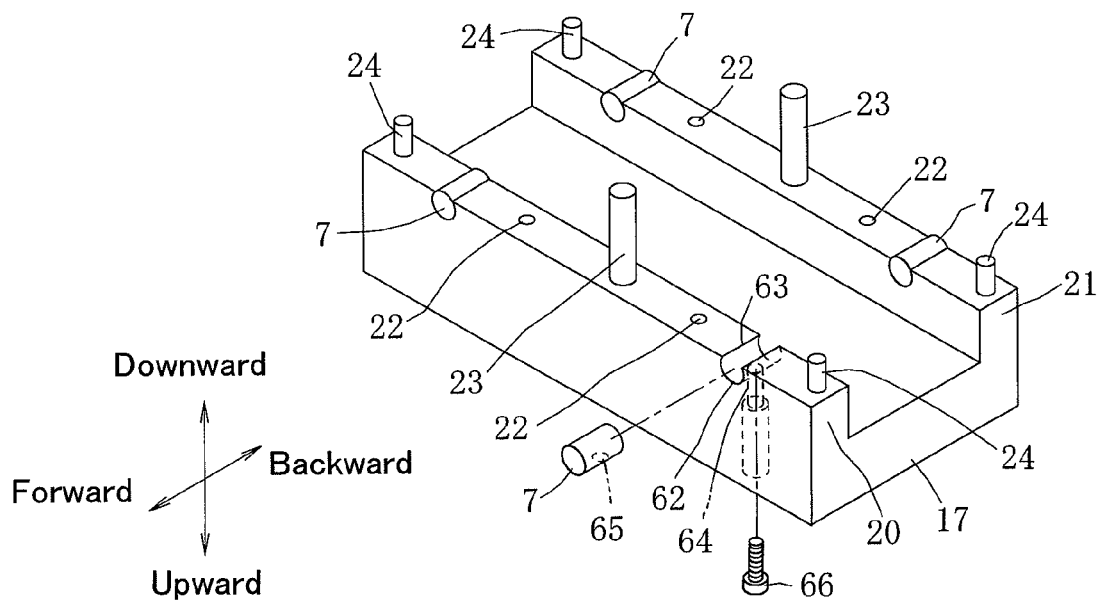
FIG. 4 is a perspective view showing an upper substrate turned upside down according to the best embodiment.
Figure 5:
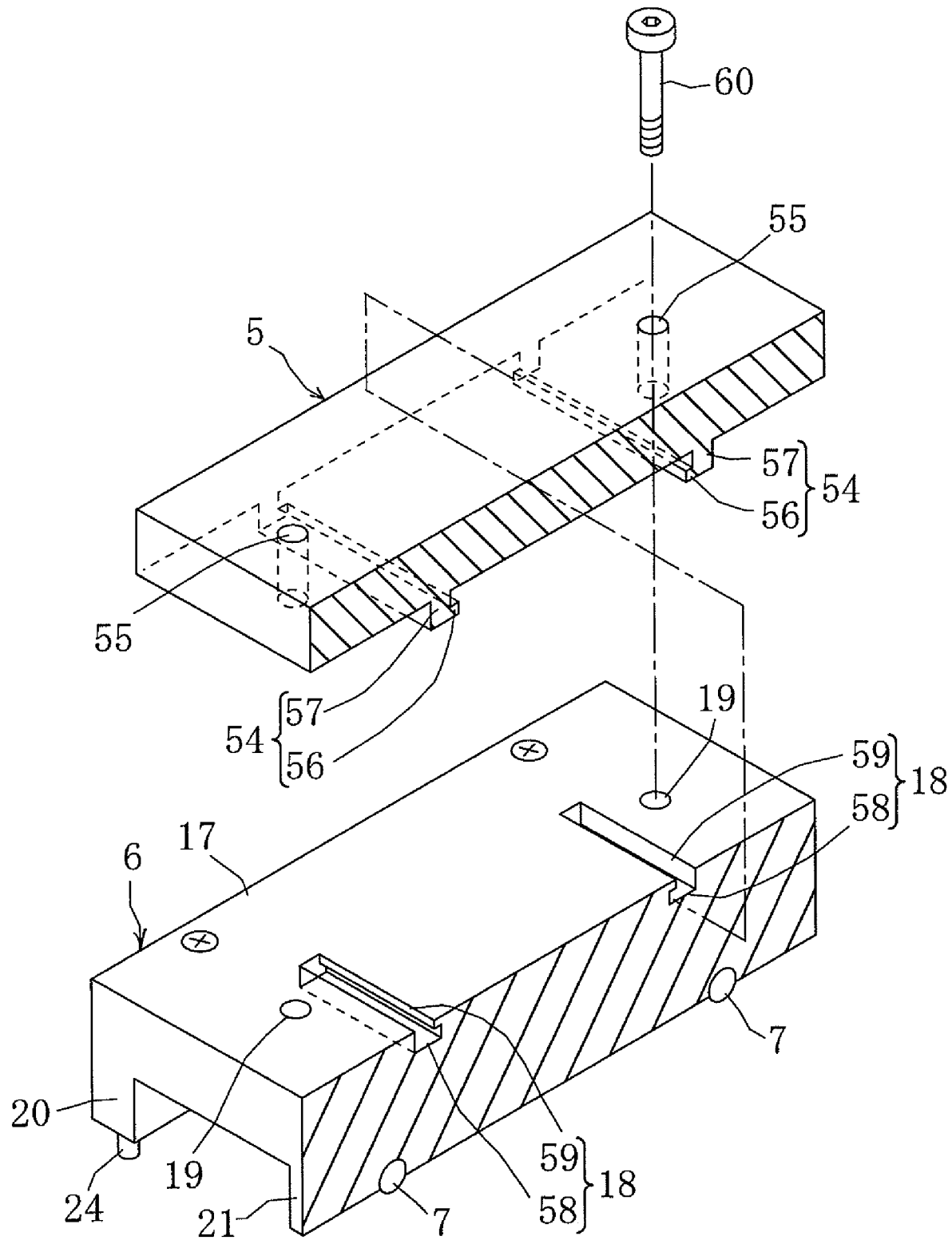
FIG. 5 is an exploded perspective view showing a portion at which an output member and the upper substrate are mounted according to the best embodiment.
Figure 6:
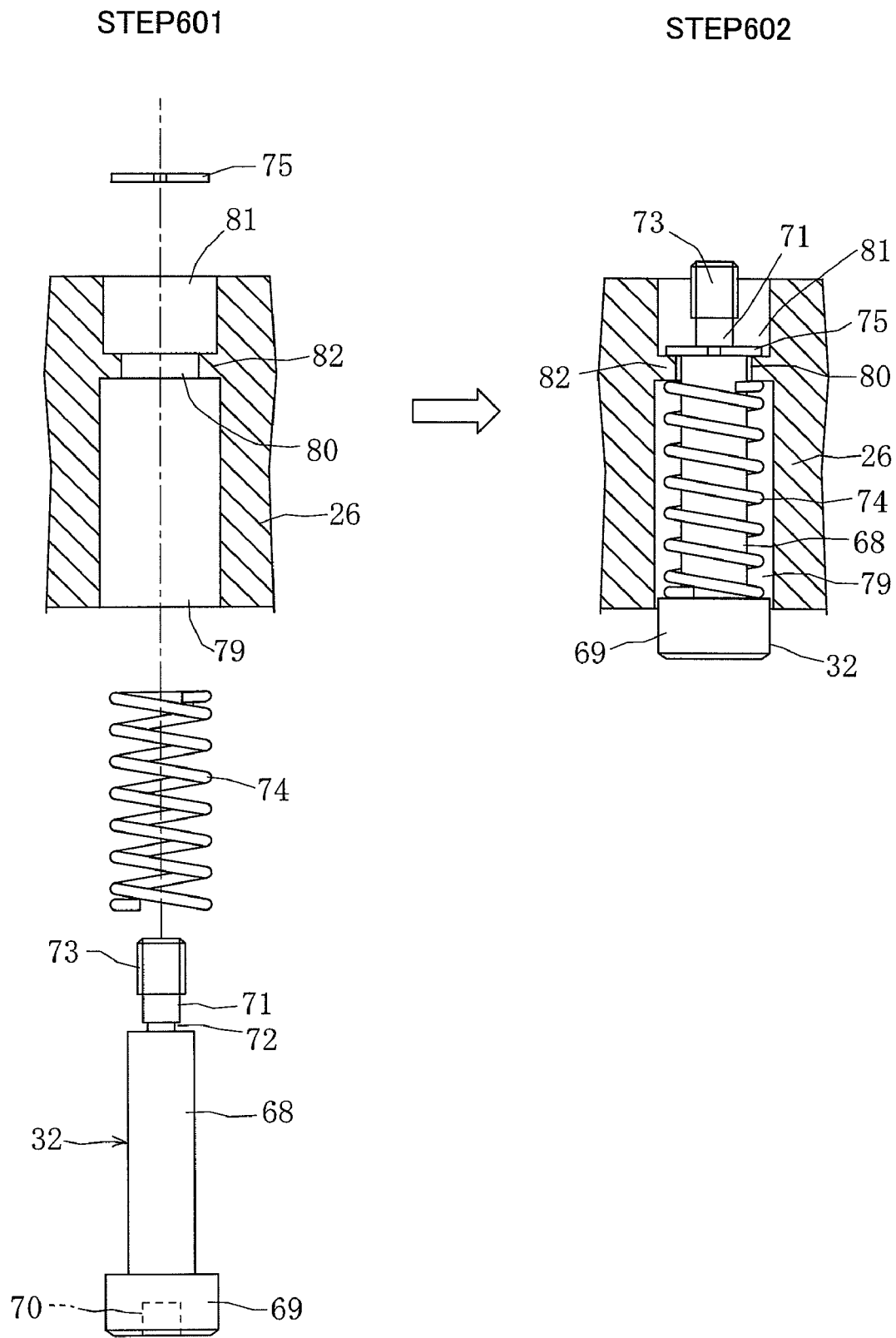
FIG. 6 is a process chart for mounting a resilient mechanism on a lower substrate according to the best embodiment.
Figure 7:
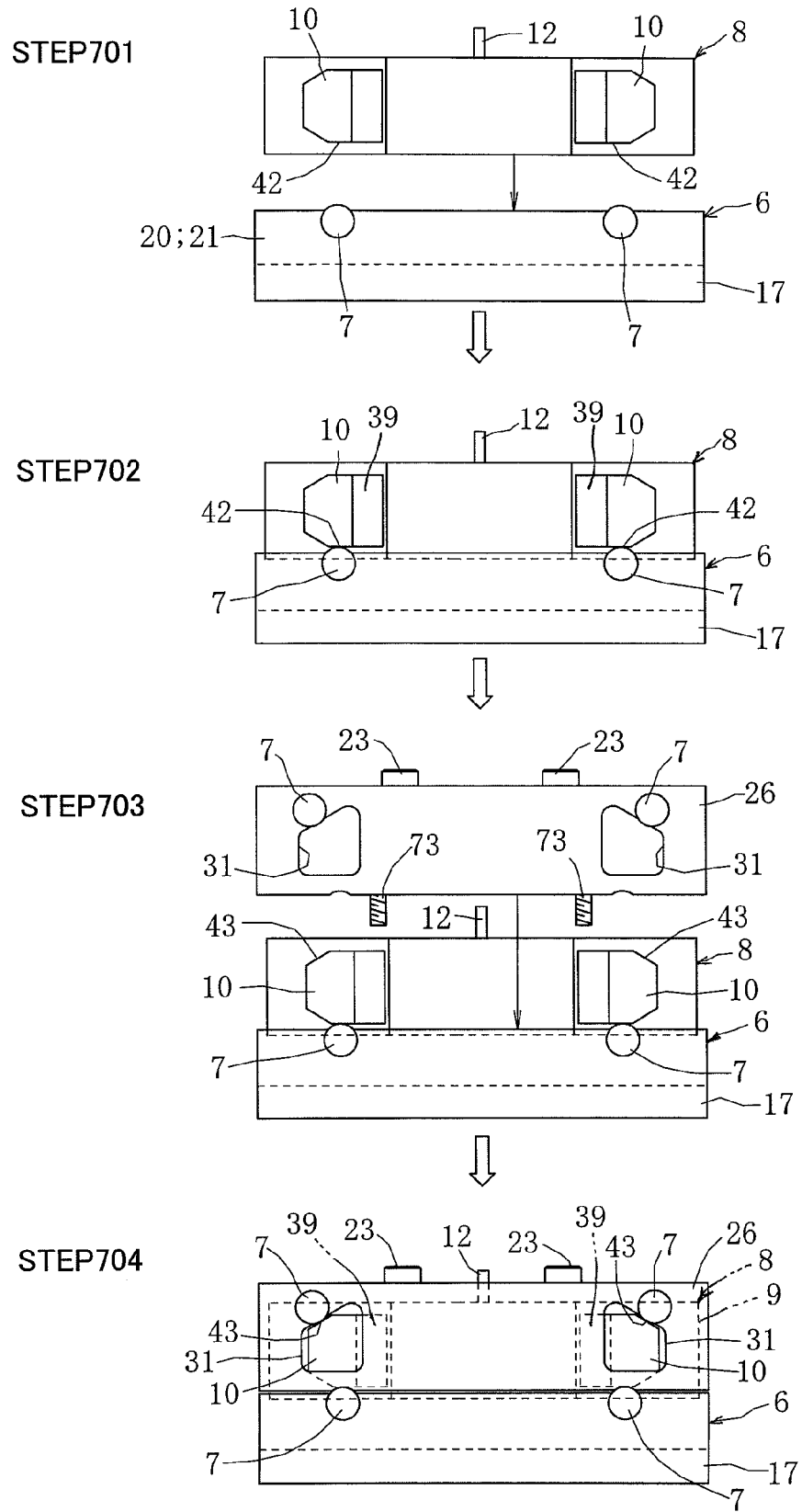
FIG. 7 is a process chart for mounting the resonator on the supporting device according to the best embodiment.

FIG. 1 shows the contour of an ultrasonic bonding device seen from beneath obliquely. FIG. 2 shows an ultrasonic vibration bonding resonator (hereinafter referred to simply as the "resonator") 8, a supporting device 6 and an oscillator 16 in an exploded state. FIG. 3 shows the front surface of the resonator 8. FIG. 4 shows an upper substrate 17 turned upside down. FIG. 5 shows a portion, to which an output member 5 and the upper substrate 17 are attached, in an exploded state. FIG. 6 shows a step of attaching a resilient mechanism 32 to a lower substrate 26. FIG. 7 shows a step of attaching the resonator 8 to the supporting device 6. FIG. 8 is a schematic view showing that the resonator 8 has been attached to the supporting device 6. The "forward", "backward", "leftward", "rightward", "upward" and "downward" directions used hereinafter are directions specified when being seen from the front side shown by an arrow S in FIG. 1 in a state wherein the ultrasonic bonding device has been disposed.

The ultrasonic vibration bonding device will be described with reference to FIG. 1. A device body 1 of the ultrasonic vibration bonding device is provided with a work space 2. The work space 2 is open at the front, right and left sides. An upper box body 3 that defines the upper side of the work space 2 is provided in the interior thereof with a pressurization mechanism 4. The lower portion of the output member 5 in the pressurization mechanism 4 is disposed in the work space 2 as projecting downward from the upper box body 3 and allowed to ascend and descend linearly within the work space 2 through driving of the pressurization mechanism 4. The output member 5 is provided on the lower portion thereof with the supporting device 6. The supporting device 6 is provided with cylindrical grasp portions 7. Though the number of the cylindrical grasp portions 7 is eight in total, i.e. four pairs, with two upper and lower grasp portions as one pair, the four grasp portions on the front side are shown in FIG. 1. The resonator 8 is provided on a resonance body 9 with support portions 10. The number of the support portions 10 is four in total, two being disposed as separated right and left on the front side of the resonance body 9 and two being disposed as separated right and left on the rear side of the resonance body 9. FIG. 1 shows the two support portions 10 on the front side. The resonance body 9 is provided on the lower surface thereof with a bonding working portion 12. The lower surface of the bonding working portion 12 serves as a bonding working face 13. The resonator 8 is attached to the supporting device 6 in the following manner. The resonance body 9 is disposed in a storage space 11 of the supporting device 6, and the four support portions 10 are individually supported with the eight grasp portions 7, with one pair of grasp portions 7 pinching one support portion 10 vertically. Thus, the structure for supporting the resonator 8 is advantageously simple. A lower box body 14 defining the lower portion of the work space 2 is provided with a receipt rack 15 that is disposed to face the lower portion of the output member 5.

The ultrasonic vibration bonding will be described. In the state wherein the lower portion of the output member 5 has been stopped at the ascent limit position and the bonding working portion 12 has been separated upward from the receipt rack 15, a member to be bonded that has plural metal portions (not shown) stacked one on top of another is mounted on the receipt rack 15. The pressurization mechanism 4 is then driven to allow the output member 5 to descend, thereby retaining under pressure the bonding working face 13 and the receipt rack 15 and simultaneously transmitting ultrasonic vibration output from the oscillator 16 to the resonator 8. As a result, the bonding working face 13 vibrates in the direction of an arrow X in FIG. 1 to transmit the vibration from the bonding working face 13 to the member to be bonded, with the result that the mating surfaces are bonded while being laterally vibrated alternately, with the mating surfaces pressurized between the bonding working face 13 and the receipt rack 15. In this case, since the eight grasp portions 7 individually pinch the four support portions 10 from upward and downward directions in the form of a line extending linearly in the forward and backward directions, the supporting device 6 reduces the loss of vibration of the resonance body 9 without forcibly stopping the vibration of the support portions 10 and appropriately bonds the mating surfaces of the member to be bonded. A structure for attaching the oscillator 16 to the resonator 8 will be described in detail with reference to FIG. 2.

Referring to FIG. 2, the supporting device 6 and resonator 8 will be described. The upper substrate of the supporting device 6 is provided with a mechanism-attaching portion 18, screw holes 19, a front wall 20 and a back wall 21. The mechanism-attaching portion 18 and screw holes 19 will be described with reference to FIG. 5. As shown in FIG. 2, the front wall 20 projects downward from the front edge portion of the upper substrate 17. The back wall 21 projects downward from the back edge portion of the upper substrate 17. The front and back walls 20 and 21 define therebetween the storage space 11. The front and back walls 20 and 21 are provided individually with the grasp portions 7, brace-supporting portions 22, a center guide rod 23 and end guide rods 24. The brace-supporting portion 22 is formed in the shape of a screw hole having a vertical hole provided with an internal thread. The grasp portions 7, center guide rod 23 and end guide rods 24 will be described in detail with reference to FIG. 4.

In FIG. 2, two lower substrates 26 of the supporting device 6 that have the same structure are used so that they may separate in the forward and backward directions and be opposed to be symmetrical in the forward and backward directions. The lower substrate 26 is provided with grasp portions 7, a center guide hole 27, end guide holes 28, support portion storage portions 29, grasp escape portions 30, windows 31 and resilient mechanisms 32. The grasp portion 7 is provided collaterally relative to the support portion storage portion 29 and formed on the lower substrate 26 so that a cylindrical part thereof extending in the forward and backward directions may project from the inside of the lower substrate 26 to the lower side of the support portion storage portion 29. The grasp portion 7 is formed in the lower substrate 26 in the following manner (refer to the lower side of FIG. 2). To be specific, a grasp-attaching hole 33 is formed in the lower substrate 26 in the form of a circular hole extending in the forward and backward directions. Part of the grasp-attaching hole 33 pierces through the lower side of the support portion storage portion 29 as an opening 34. The lower side of the lower substrate 26 is provided therein with a bolt insertion hole 35 in the vertical direction. The grasp portion 7 is formed therein with a screw hole 36 having a vertical hole provided with an internal thread. When the grasp portion 7 has been inserted into the grasp-attaching hole 33, a peripheral part of the grasp portion 7 projects arcuately from the opening 34 to the lower side of the support portion storage portion 29. Thereafter, a bolt 37, such as a screw, is inserted from below the lower substrate 26 into the screw hole 36 via the bolt insertion hole 35 to complete screw fitting. As a result, the grasp portion 7 is fixed to the lower substrate 26 with the bolt 37 so as not to fall off the lower substrate 26.

The center guide hole 27 is formed in the lower substrate 26 from the upper surface thereof at the center thereof in the rightward and leftward directions in the shape of a dent or through hole. When the center guide hole 27 or end guide hole is in the form of a dent, the lower substrate 26 is provided therein with an air vent port (not shown). The support portion storage portion 29 is formed between the center guide hole 27 and the end guide hole 28 in the form of a dent opening to the side on which the upper and two lower substrates 17 and 26 stand face to face. It is noted that the center guide rod 23 and end guide rods 24 may be formed on the lower substrates 26 and that center guide hole 27 and end guide holes 28 may be formed in the upper substrate 17. The grasp escape portion 30 is provided collaterally relative to the support portion storage portion 29 and formed in the shape of a dent extending from the upper surface of the lower substrate 26 downward. The window 31 is provided collaterally relative to the support portion storage portion 29 and formed in the shape of a through hole extending in the forward and backward directions. The resilient mechanism 32 will be described in detail with reference to FIG. 6.

In FIG. 2, the resonance body 9 is provided with the support portions 10, the bonding working portion 12, connection portions 39, a tool attaching portion 40 and an instrument attaching portion 41. The resonance body 9 is also called an "ultrasonic horn", has a length corresponding to at least one wavelength of a frequency of resonance by the ultrasonic oscillation transmitted from the oscillator 16, vibrates in the vibration direction X and has points of maximum oscillation at the center and opposite ends thereof and at least one point of minimum oscillation each between the points of maximum oscillation. The bonding working portion 12 is also called a "bonding tool" and has a length extending orthogonally to the vibration direction X and corresponding to the integral multiple of one second of the resonance frequency.

The support portions 10 are disposed symmetrically on the forward and backward sides and right and left sides and each of them assumes, when seen from the front side, a hexagonal shape comprising upper and lower horizontal faces 42, upper and lower slant faces 43 and right and left vertical faces 44. This hexagonal shape is a combination of a trapezoidal shape and a quadrangular shape. The horizontal faces 42 are made parallel to the bonding working face 13. The slant faces 43 are made close to each other in accordance as they extend toward the outside from the center in the rightward and leftward directions of the resonance body 9. The connection portion 39 is formed in the shape of a crank comprising a proximal part 45, a distal part 46 and an intermediate part 47. The proximal parts 45 are each in the shape of a thick plate projecting forward from the front side of the resonance body 45 or backward from the back side of the resonance body 45 at the points of minimum oscillation equidistant from the center point of maximum oscillation so as to be orthogonal to the vibration direction X. The distal parts 46 are each in the shape of a thick plate projecting from one end of the support portion 10 so as to be orthogonal to the vibration direction X. The intermediate parts 47 are each in the shape of a thin plate in parallel to the vibration direction X for connecting the proximal and distal parts 45 and 46. That is to say, the connection portion 39 serves to connect the support portion 10 and the resonance body 9 so as not to be in contact with each other. During the course of bonding, therefore, even when a load is exerted on the resonator 8 and the position of the point of minimum oscillation of the resonator 8 relative to the proximal part 45 deviates from the theoretical position to vibrate the proximal part 45, the intermediate part 47 absorbs vibration induced from the proximal part 45 toward the distal part 46. Therefore, the ultrasonic oscillation generated in the oscillator 16 can suitably be transmitted from the resonance body 9 to the bonding working face 13 efficiently, thereby eliminating rattle of the device body 1, pressurization mechanism 4, resonator 8, support device 6 and resilient mechanism 32.

The tool attaching portion 40 is disposed on the upper and lower surfaces of the resonance body 9 at the position of the center point of maximum oscillation in the resonance body 9. Therefore, the support portion 10 and tool attaching portion 40 are disposed on the resonance body 9 so as to be at right angles to each other. The tool attaching portion 40 is formed therein with a screw hole 48 having a vertical hole provided with an internal thread. The bonding working portion 12 is attached to the lower tool attaching portion 40 with a headless bolt (not shown) corresponding to a headless bolt 52. To be specific, one end of the headless bolt (not shown) is fitted in a screw hole (not shown) formed in the upper portion of the bonding working portion 12 and the other end of the headless bolt is fitted in the screw hole 48, thereby attaching the bonding working portion 12 to the resonator body 9. Since the two tool attaching portions are disposed, one on the upper surface of the resonance body 9 and the other on the lower surface thereof, when the bonding working portion 12 has been attached to the upper tool attaching portion 40, the resonance body 8 may be used as being turned upside down so as to direct the bonding working portion 12 downward. The instrument attaching portion 41 is formed in the right and left end faces of the resonance body 9 in the shape of a horizontal hole provided with an internal thread. The oscillator 16 is an electro-acoustic transducer or electro-vibration transducer which generates and then outputs ultrasonic oscillation of a prescribed frequency by means of electric power supplied from an ultrasonic generator (not shown) and which comprises a piezoelectric device or magnetostrictor for converting electric energy into mechanical energy. The output end of the oscillator 16 is formed therein with a screw hole 51 having a horizontal hole provided with an internal thread. One end of the headless bolt 52 is fitted in the instrument attaching portion 41 and the other end thereof is fitted in the screw hole 51, thereby attaching the oscillator 16 coaxially to the resonator 8.

The support portion 10 will be described in detail with reference to FIG. 3. The extended lines of the upper slant faces 43 at the right and left positions of the support portions 10 intersect at a certain point P1 existing on a perpendicular line L1 relative to the bonding working portion 12 and passing through a point f3 of maximum oscillation. Angles θ1 formed between the extended lines of the upper slant faces 43 at the right and left positions and the perpendicular line L1 are equal to each other. The extended lines of the lower slant faces 43 at the right and left positions of the support portions 10 intersect at a certain point P2 existing on the perpendicular line L1 relative to the bonding working portion 12 and passing through the point f3 of maximum oscillation. The extended lines of the lower slant faces 43 at the right and left positions and the perpendicular line L1 form between them angles θ2 that are equal to each other. In addition, the angles θ1 and θ2 are equal to each other (θ1=θ2). In FIG. 3, therefore, this configuration is at an advantage in implementing the bonding appropriately even in a state wherein the resonator 8 has been supported on the supporting device 6 (refer to FIG. 1), with the point P1 directed downward and the point P2 directed upward, i.e. the resonator 8 turned upside down, and with the bonding working portion 12 detached from the tool attaching portion 40 on the side of the point P2 and attached to the tool attaching portion 40 on the side of the point P1.

Referring to FIG. 4, the grasp portion 7, center guide rod 23 and end guide rod 24 of the upper substrate will be described. The grasp portions 7 are formed on the upper substrate 17 so that cylindrical parts thereof extending in the forward and backward directions may project from the interiors of the front and back walls 20 and 21 to the exteriors of the lower portions of the front and back walls 20 and 21. The grasp portion 7 is formed on the upper substrate in the following manner (refer to the lower side of FIG. 4). The procedure will be described, with the front wall 20 of the upper substrate 17 cited as an example. The front wall 20 is formed therein with a grasp-attaching hole 62 extending in the forward and backward directions as a circular hole. Part of the grasp-attaching hole 62 pierces through the front wall 20 as an opening 63 to the lower side of the front wall 62. The front wall 62 is formed therein on the upper side thereof with a bolt insertion hole 64 directed vertically. The grasp portion 7 is formed therein with a screw hole 65 having a vertical hole provided with an internal thread.

When the grasp portion 7 has been inserted into the grasp-attaching hole 62, part of the periphery of the grasp portion 7 projects arcuately from the opening 63 downward of the upper substrate 17. A bolt 66, such as a screw, is inserted from above the upper substrate 17 and engaged via the bolt insertion hole 64 with the screw hole 65, thereby fixing the grasp portion 7 to the front wall 20 with the bolt 66 so as not to drop from the upper substrate 17. A structure in which the grasp portion 7 is formed on the back wall 21 will be understood with ease when the front wall 20 described above is changed to the back wall 21. The center guide rods 23 are formed individually on the front and back walls 20 and 21 at the respective centers in the rightward and leftward directions of the front and back walls 20 and 21 so as to project downward from the lower sides of the front and back walls 20 and 21. The end guide rods 24 are formed at the respective opposite ends of the front and back walls 20 and 21 so as to project downward from the lower side of the front and back walls 20 and 21.

Referring to FIG. 5, a section at which the output member 5 and the upper substrate 17 are attached to each other will be described. The output member 5 is formed with grasp-attaching portions 54 separated right and left and with bolt insertion holes 55 also separated right and left. The grasp-attaching portion 54 comprises a suspension convex 56 and a support wall 57. The upper substrate 17 is formed with the mechanism-attaching portions 18 separated right and left and with the screw holes 19 also separated right and left. The mechanism-attaching portion 18 comprises a suspension concave 58 and a slit 59. The suspension convex 56 is in the form of a protuberance extending in the forward and backward directions. The support wall 57 has a lateral width smaller than that of the suspension convex 56 and than that of the slit 59 and serves as a member for attaching the suspension convex 56 thereto to dispose the suspension convex below the output member 5. The bolt insertion holes 55 are positioned outside the grasp-attaching portions 54. The suspension concave 58 is in the form of a dent extending in the forward direction from the back side of the upper substrate 17. The slit 59 has a lateral width smaller than that of the suspension concave 58, pierces through the upper outside of the suspension concave 55 and upper substrate 17, is in the form of a gap hollowing in the forward direction from the back side of the upper substrate 17 and piercing in the upward and downward directions and is positioned outside the mechanism-attaching portion 18.

The upper substrate 17 is attached to the output member 5 in the following manner. First, the mechanism-attaching portions 18 are inserted from the forward direction onto the grasp-attaching portions 54. In that case, the suspension concaves 58 and suspension convexes 56 are engaged with each other and the slits 59 and support walls 57 are also engaged with each other. As a result, the upper substrate 17 is attached to the output member 5 by means of the mechanism-attaching portions 18 and grasp-attaching portions 54 in a connectable and removable manner in the forward and backward directions. In this case, though not shown, by making the lateral width of the slits 59 wider gradually toward the backward direction or by making the lateral width of the suspension convexes 56 narrower gradually toward the backward direction, the suspension convexes 56 and suspension concaves 58 may easily be engaged with each other. Subsequently, when the screw holes 19 and bolt insertion holes 59 have been in alignment with each other, bolts 60 are inserted from above the output member 5 into the bolt insertion holes 55 and engaged with the screw holes 19 via the bolt insertion holes 55. Consequently, the bolts 60 serve as latches relative to the forward and backward directions in which the upper substrate 17 is connected to and removed from the output member 5, thereby fixing the upper substrate 17 to the output member 5.

Referring to FIG. 6, the resilient mechanism 32 will be described. As shown at Step 601 in FIG. 6, the resilient mechanism 32 has a resilient body support post 68 that has one end thereof provided with a head 69 in the shape of a plate having a larger outside diameter than the resilient body support post 68. The head 69 is provided with a concave 70 for receiving a tool. The other end of the resilient body support post 68 is provided with a projection 71 in the shape of a column having a smaller outside diameter than the resilient body support post 68. The projection 71 is formed therein with a groove 72 for receiving a retaining ring that rides the entire loop of the projection 71. The end of the projection 71 departing from the resilient body support post 68 is provided with an external thread 73. The resilient mechanism 32 comprises a resilient body 74 and a retaining ring 75 besides the resilient body support post 68. The resilient body 74 is formed as a coil spring.

The part of the lower substrate 26 to which the resilient mechanism 32 is attached is provided with a resilient body storage portion 79, a through hole 80 and a retaining ring storage portion 81. The resilient body storage portion 79 is formed in the shape of a dent extending upward from the lower surface of the lower substrate 26. The inside diameter of the resilient body storage portion 79 is larger than the outside diameter of the resilient body 74 or retaining ring 75. The through hole 80 is formed in a partition 82 for partitioning the resilient body storage portion 79 and the retaining ring storage portion 81. The inside diameter of the through hole 80 is smaller than the outside diameter of the resilient body 74 or retaining ring 75 and larger than the outside diameter of the resilient body support post 68 or external thread 73. The retaining ring storage portion 81 is formed in the shape of a dent extending downward from the upper surface of the lower substrate 26. The inside diameter of the retaining ring storage portion 81 is larger than the outside diameter of the retaining ring 75.

The resilient mechanism 32 is incorporated into the lower substrate 26 in the following manner. At first, the resilient body 74 is passed from the side of the external thread 73 to the projection 71 and groove 72 for receiving the retaining ring, attached so as to surround the resilient body support post 68 and received on the head 69. Then, the external thread 73 is inserted from below the lower substrate 26 into the retaining ring storage portion 81 via the resilient body storage portion 79 and through hole 80 in the order mentioned. Subsequently, the head 69 is pushed from downward to upward to compress the resilient body 74 between the partition 82 and the head 69 and to allow the groove 72 for receiving the retaining ring to project upward of the lower substrate 26. With this state maintained, the retaining ring 75 is mounted on the groove 72. When the upward pushing force exerted onto the head 69 has been released, the restoring force of the resilient body 74 permits the retaining ring 75 to be stored in the retaining ring storage portion 81 and received on the partition 82 and the resilient body support post 68 and resilient body 74 to be stored in the resilient body storage portion 79. As a result, the resilient mechanism 32 completes its incorporation into the lower substrate 26 as shown at Step 602 in FIG. 6.

Referring to FIG. 7, the case where the resonator 8 is attached to the supporting device 6 will be described. At first, as shown at Step 701 in FIG. 7, the upper substrate 17 turned upside down is placed on a workbench (not shown). That is to say, the upper substrate 17 placed on the workbench is in a state wherein the grasp portions 7 are directed upward. The resonator 8 is also turned upside down. That is to say, the resonator 8 turned upside down is in a state wherein the bonding working portion 12 is directed upward. Then, as shown at Step 702, the horizontal faces 42 of the support portions 10 directed toward the side of the upper substrate 17 are placed on the portions projecting arcuately from the upper surfaces of the front and back walls 20 and 21 at the grasp portions 7. Thus, when the support portions 10 have been placed at the grasp portions 7, none of the resonance body 9, bonding working portion 12 and connection portion 39 comes into contact with the upper substrate 17.

Then, as shown at Step 703, the lower substrate 26 is turned upside down. That is to say, the lower substrate 26 turned upside down is in a state wherein the external thread 73 of the resilient mechanism 32 is directed downward. In addition, as shown at Step 704, the parts of the grasp portions 7 projecting arcuately toward the inside of the windows 31 of the lower substrate is placed on the lower slant faces 43 of the support portions 10 (the faces directed upward at Step 704). Thus, when the grasp portions 7 of the lower substrate 26 is placed on the support portions 10, the support portions 10 are stored so as not to come into contact with the support portion storage portions 29 (refer to FIG. 2) and none of the resonance body 9, bonding working portion 12 and connection portion 39 comes into contact with the lower substrate 26. In this way, when the grasp portions 7 of the lower substrate 26 are placed on the support portions 10, as shown in FIG. 8, the center guide rod 23 and center guide hole 27 are engaged with each other and the end guide rods 24 and end guide holes 28 are engaged with each other. As a result, the upper and lower substrate 17 and 26 do not move mutually alternately in the lateral direction. When the upper substrate 17 is firmly supported, for example, the lower substrate 26 does not move in the lateral direction.

Thereafter, as shown in FIG. 8, the external thread 73 of the resilient mechanism 32 is attached to the brace-supporting portion 22, and the resilient mechanism 32 connects the upper and lower substrate 17 and 26 together. In that case, the amount of the external thread 73 to be screwed into the brace-supporting portion 22 is adjusted so as not to allow the upper substrate 17 and the retaining ring 75 to be in contact with the lower substrate 26 and the upper substrate 17, respectively. As a result, since the resilient body 74 biases the upper and lower substrates 17 and 26 resiliently so as to become close to each other and since the grasp portions 7 of the supporting device 6 support the support portions 10 as being linearly pinched in the upward and downward directions under the action of resiliency by the resilient body 74, there is no adverse effect on the vibration at the resonator 8 and bonding working portion 12. This is very advantageous. The bonding working face 13 projects downward from the lower substrate 26 after the resonator 8 is supported on the supporting device 6.

In the best embodiment, as shown in FIG. 8, the bonding working face 13 and horizontal face 42 in the resonator 8 are parallel to each other and, when the supporting device 6 has grasped the resonator 8, part of the four grasp portions 7 in the upper substrate 17 comes into linear contact with the upper horizontal faces 42 in the resonator 8 in the forward and backward directions under the action of resiliency by the resilient body 74 and part of the four grasp portions 7 in the lower substrate 26 comes into linear contact with the lower slant faces 43 in the resonator 8 in the forward and backward directions. Therefore, when the configuration has been established so that the part of the four grasp portions 7 in the upper substrate 17 coming into linear contact with the horizontal faces may be positioned at a surface in parallel to the upper surface of the receiving rack 15 (refer to FIG. 1), by grasping the resonator 8 with the supporting device 6, the bonding working face 13 and the upper surface of the receiving rack 15 become in parallel to each other, thereby enabling a member to be bonded to be appropriately bonded under pressure. In addition, the part coming into linear contact with the slant faces 43 of the four grasp portions 7 in the lower substrate 26 pushes the four respective support portions 10 from outside to the inside, that is, in the direction of the bonding working portion 12. For this reason, it is possible to accurately determine the position of the bonding working portion 12 relative to the member to be bonded without displacing the resonator 8 in the lateral direction and to appropriately bond the member to be bonded.

FIG. 9 shows a resonator 8 according to another embodiment for carrying out the present invention. According to another embodiment, as shown in FIG. 9, a bonding working portion 83 is formed in the shape of a chip and thus differs in structure from that of the embodiment shown in FIG. 2. To be specific, the dimension of the binding working portion 83 projecting from the upper or lower surface of the resonance body 9 is much shorter than that of the bonding working portion 12 projecting from the upper or lower surface of the resonance body shown in FIG. 2. The bonding working portion 83 projects by around a few mm from the upper or lower surface of the resonance body 9 and does not have such a screw hole 48 as shown in FIG. 2. When the resonator 8 has been supported on the supporting device 6 (refer to FIG. 8), the bonding working portion 83 projects downward of the lower substrate 26 (refer to FIG. 8).

In FIG. 2, the length in the resonance body 9, though not shown, in the direction identical with the vibration direction X may be the integral multiple of one wavelength of the resonance frequency. Though the oscillator 16 is attached directly to one end of the resonator 8, it may be attached, via a booster (not shown) having a length that is ½ or the integral multiple of ½ of the resonance frequency, to the resonator 8. In that case, the resonator and booster are coaxially joined to each other with a headless bolt corresponding to the headless bolt 52. The resonance body 9 may comprise an ultrasonic horn having the bonding working portion 12 and a booster having the support portions 10. In that case, the ultrasonic horn and booster are joined to each other with a headless bolt corresponding to the headless bolt 52. In FIG. 2 and FIG. 4, the grasp portion 7 may be formed into a sphere body (not shown).

Though, in FIG. 1, after plural members to be bonded are mounted on the receiving rack 15, they are pressurized between the bonding working face 13 and the receiving rack 15, it is possible to adopt a structure, though not shown, wherein the bonding working face 13 is provided therein with a suction port and whereby one of the members to be bonded is sorbed on the bonding working face 13 by the suction action of suction means, the other of the members to be bonded is placed on the receiving rack 15 and descent of the resonator 8 resulting from the descending motion of the pressuring mechanism 4 enables the members to be bonded to be pressurized in a state of being stacked one on top the other. In that case, the outside surface of the resonator 8 other than the bonding working face 13 is provided with a hose connection portion to which a hose of a suction mechanism, and the resonator is provided therein with a suction path connecting the suction port and the hose connection portion. In the case where the member to be bonded that is sorbed on the bonding working face 13 has a small size like a semiconductor chip, a bonding chip having a small-diameter suction port may be bonded by braze to the bonding working face 13. In addition, it is possible to provide the resonator 8 at the point of minimum oscillation with a port for a heater connecting the upper surface of the resonator 8 and the inside thereof and heat the resonator 8 with an electrical heater inserted into and attached to the heater port, thereby enabling bonding of the plural members to be bonded utilizing both bonding energy resulting from the ultrasonic vibration and heat energy resulting from the electrical heater.

What is claimed is:

1. An ultrasonic vibration bonding resonator comprising:
   a resonance body;
   bonding working portions having a bonding working face and provided at a point of maximum oscillation on upper and lower surfaces of the resonance body; and
   support portions provided at two points of minimum oscillation apart from the bonding working portions to opposite sides in a direction of ultrasonic vibration as projecting from front and back surfaces of the resonance body;
   wherein each of the support portions has a hexagonal shape, when being seen from a front side, having upper and lower horizontal faces, upper and lower slant faces and right and left vertical faces, and the horizontal faces are in parallel to the bonding working face; and
   wherein an extended line of the upper slant face of the support portion at one of the two points of minimum oscillation apart from the bonding working portions to the opposite sides in the direction of ultrasonic vibration and an extended line of the upper slant face of the support portion at the other of the two points of minimum oscillation intersect at a certain point existing on a perpendicular line relative to the bonding working portion and passing through the point of maximum oscillation, an extended line of the lower slant face of the support portion at one of the two points of minimum oscillation apart from the bonding working portions to the opposite sides in the direction of ultrasonic vibration and an extended line of the lower slant face of the support portion at the other of the two points of minimum oscillation intersect at a certain point existing on the perpendicular line relative to the bonding working portion, which line passes through the point of maximum oscillation, and each of the extended lines of the upper slant faces and the perpendicular line form between them an angle equal to an angle formed between each of the extended lines of the lower slant faces and the perpendicular line.

2. An ultrasonic vibration bonding resonator comprising:
   a resonance body;
   tool-attaching portions provided at a point of maximum oscillation on upper and lower surfaces of the resonance body;
   a bonding working portion having a bonding working face and attached to one of the tool-attaching portions with a screw;
   support portions provided at two points of minimum oscillation apart from the bonding working portion to opposite sides in a direction of ultrasonic vibration as projecting from front and back surfaces of the resonance body;
   wherein each of the support portions has a hexagonal shape, when being seen from a front side, having upper and lower horizontal faces, upper and lower slant faces and right and left vertical faces, and the horizontal faces are in parallel to the bonding working face; and wherein an extended line of the upper slant face of the support portion at one of the two points of minimum oscillation apart from the bonding working portions to the opposite sides in the direction of ultrasonic vibration and an extended line of the upper slant face of the support portion at the other of the two points of minimum oscillation intersect at a certain point existing on a perpendicular line relative to the bonding working portion and passing through the point of maximum oscillation, an extended line of the lower slant face of the support portion at one of the two points of minimum oscillation apart from the bonding working portions to the opposite sides in the direction of ultrasonic vibration and an extended line of the lower slant face of the support portion at the other of the two points of minimum oscillation intersect at a certain point existing on the perpendicular line relative to the bonding working portion, which line passes through the point of maximum oscillation, and each of the extended lines of the upper slant faces and the perpendicular line form between them an angle equal to an angle formed between each of the extended lines of the lower slant faces and the perpendicular line.

3. An ultrasonic vibration bonding resonator according to claim 1, further comprising a supporting device that comprises:
   an upper substrate;
   two lower substrates separated from each other in forward and backward directions; and
   a resilient body;
   wherein the upper substrate is provided with four grasp portions each in point contact with or, in forward and backward directions, in linear contact with each of the upper horizontal faces of the support portions of the ultrasonic vibration bonding resonator, and the lower substrates are provided with four grasp portions each in point contact with or, in the forward and backward directions, in linear contact with each of the lower slant faces of the support portions of the ultrasonic vibration bonding resonator; and
   wherein the resilient body affords resilience to the upper and lower substrates for biasing the upper and lower substrates to become close to each other.

4. An ultrasonic vibration bonding resonator according to claim 3, wherein the upper substrate is provided with guide rods projecting downward and the lower substrates are provided with guide holes, each in a form of a dent or through hole extending from upward to downward, for receiving the guide rods so that the guide rods may ascend and descend or wherein the upper substrate is provided with guide holes, each in a form of a dent or through hole extending from downward to upward, and the lower substrates are provided with guide rods projecting upward for being received in the guide holes so that the guide rods may ascend and descend.

5. An ultrasonic vibration bonding resonator according to claim 2, further comprising a supporting device that comprises:
   an upper substrate;
   two lower substrates separated from each other in forward and backward directions; and
   a resilient body;
   wherein the upper substrate is provided with four grasp portions each in point contact with or, in forward and backward directions, in linear contact with each of the upper horizontal faces of the support portions of the ultrasonic vibration bonding resonator, and the lower substrates are provided with four grasp portions each in point contact with or, in the forward and backward directions, in linear contact with each of the lower slant faces of the support portions of the ultrasonic vibration bonding resonator; and
   wherein the resilient body affords resilience to the upper and lower substrates for biasing the upper and lower substrates to become close to each other.

6. An ultrasonic vibration bonding resonator according to claim 5, wherein the upper substrate is provided with guide rods projecting downward and the lower substrates are provided with guide holes, each in a form of a dent or through hole extending from upward to downward, for receiving the guide rods so that the guide rods may ascend and descend or wherein the upper substrate is provided with guide holes, each in a form of a dent or through hole extending from downward to upward, and the lower substrates are provided with guide rods projecting upward for being received in the guide holes so that the guide rods may ascend and descend.

* * * * *